(12) United States Patent
Mukerjee et al.

(10) Patent No.: US 8,507,131 B2
(45) Date of Patent: Aug. 13, 2013

(54) SYSTEM FOR ADDING SULFUR TO A FUEL CELL STACK SYSTEM FOR IMPROVED FUEL CELL STABILITY

(75) Inventors: Subhasish Mukerjee, Pittsford, NY (US); Karl J Haltiner, Jr., Fairport, NY (US); Jeffrey G. Weissman, West Henrietta, NY (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 13/357,774

(22) Filed: Jan. 25, 2012

(65) Prior Publication Data

US 2012/0251906 A1 Oct. 4, 2012

Related U.S. Application Data

(62) Division of application No. 13/074,589, filed on Mar. 29, 2011, now Pat. No. 8,129,054.

(51) Int. Cl.
*H01M 4/02* (2006.01)
(52) U.S. Cl.
USPC ........... 429/211; 429/425; 429/410; 429/412; 429/423; 429/428
(58) Field of Classification Search
USPC ....................................................... 429/410
See application file for complete search history.

(56) References Cited

U.S. PATENT DOCUMENTS

| 5,500,307 | A | 3/1996 | Anzai et al. |
| 7,427,388 | B2 | 9/2008 | Garg et al. |
| 2007/0092766 | A1 | 4/2007 | England et al. |
| 2010/0279194 | A1* | 11/2010 | Elangovan et al. ........... 429/465 |
| 2011/0059377 | A1* | 3/2011 | Scotto et al. .................. 429/416 |

OTHER PUBLICATIONS

Subhash C. Singhal, Pacific Northwest National Laboratory, Mar. 2008, Electrochemistry Encyclopedia, "Solid Oxide Fuel Cells", pp. 1-8.
Gregory J. Offer, Joshua Mermelstein, Edward Brightman, Nigel P. Brandon; "Thermodynamics and Kinetics of the Interaction of Carbon and Sulfur with Solid Oxide Fuel Cell Anodes"; pp. 763-780, Jan. 2009.

* cited by examiner

*Primary Examiner* — Barbara Gilliam
*Assistant Examiner* — Gary Harris
(74) *Attorney, Agent, or Firm* — James M. Chan

(57) ABSTRACT

A system for adding sulfur to a reformate stream feeding a fuel cell stack, having a sulfur source for providing sulfur to the reformate stream and a metering device in fluid connection with the sulfur source and the reformate stream. The metering device injects sulfur from the sulfur source to the reformate stream at a predetermined rate, thereby providing a conditioned reformate stream to the fuel cell stack. The system provides a conditioned reformate stream having a predetermined sulfur concentration that gives an acceptable balance of minimal drop in initial power with the desired maximum stability of operation over prolonged periods for the fuel cell stack.

7 Claims, 5 Drawing Sheets

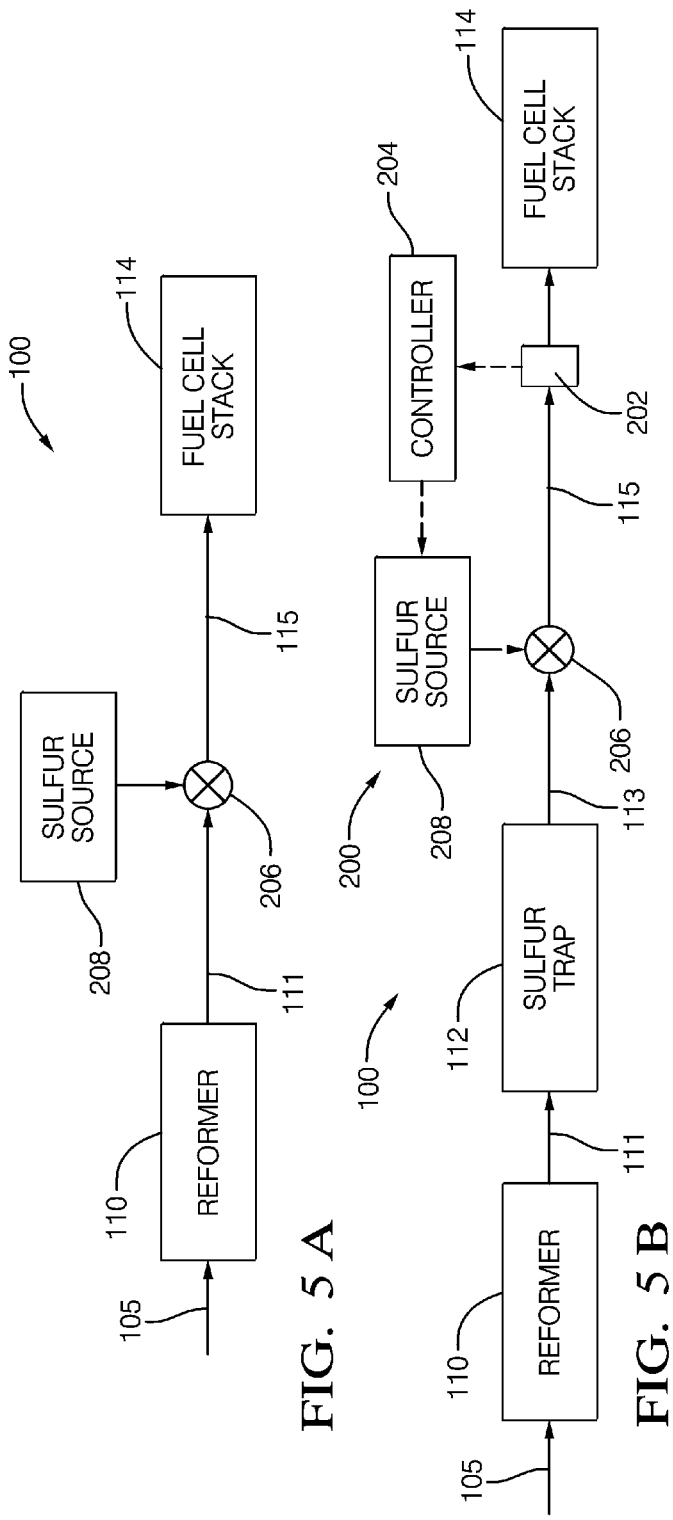

SYSTEM FOR ADDING SULFUR TO A FUEL CELL STACK SYSTEM FOR IMPROVED FUEL CELL STABILITY

CROSS-REFERENCE TO RELATED APPLICATIONS

This application is a divisional of co-pending U.S. patent application Ser. No. 13/074,589 filed on Mar. 29, 2011, which is hereby incorporated by reference in its entirety.

GOVERNMENT-SPONSORED STATEMENT

This invention was made with the United States Government support under Contract DE-FC26-02NT41246 awarded by the U.S. Department of Energy. The Government has certain rights in this invention.

TECHNICAL FIELD OF INVENTION

The present disclosure is related to a system of adding sulfur to a fuel cell stack system; more particularly, a system for adding sulfur to the reformate stream that feeds a fuel cell stack.

BACKGROUND OF INVENTION

Fuel cells are used to produce electricity when supplied with fuels containing hydrogen and an oxidant such as air. A typical fuel cell includes an ion conductive electrolyte layer sandwiched between a cathode layer and an anode layer. There are several different types of fuel cells known in the art, one of which is a solid oxide fuel cell (SOFC). A SOFC is regarded as a highly efficient electrical power generator that produces high power density with fuel flexibility.

In a typical SOFC, air is passed over the surface of the cathode layer and a reformate hydrocarbon fuel is passed over the surface of the anode layer opposite that of the cathode layer. Oxygen ions from the air migrate from the cathode layer through the dense electrolyte to the anode layer in which the oxygen ions reacts with the hydrogen and carbon monoxide in the fuel, forming water and carbon dioxide; thereby, creating an electrical potential between the anode layer and the cathode layer. The electrical potential between the anode layer and the cathode layer is typically about 1 volt and power around 1 $W/cm^2$. Multiple SOFCs are stacked in series to form a SOFC stack having sufficient power output for commercial applications.

The anode acts as a catalyst for the oxidation of hydrocarbon fuels and has sufficient porosity to allow the transportation of the fuel to and the products of fuel oxidation away from the anode/electrolyte interface, where the fuel oxidation reaction takes place. The anode of a typical SOFC is typically formed of a nickel/yttria-stabilized zirconia (Ni/YSZ) composition. The use of nickel in the anode is desirable for its abilities to be a catalyst for fuel oxidation and current conductor.

Although nickel is a desirable hydrogen oxidation catalyst, nickel also catalyzes the formation of carbon from hydrocarbons under reducing conditions. Over time, the carbons atoms are deposited onto the surface of the Ni/YSZ based anode. As the number of carbon atoms deposited on the surface of the anode increases, the level of damage and deactivation of the anode from carbon formation increases dramatically. Also, prolonged steady state operation at elevated temperatures, which is between typically between 600° C. to 900° C. for a SOFC stack, causes the nickel in the Ni/YSZ composition to coarsen due to grain growth. The coarsening of the granular microstructure of the anode further reduces the efficiency of the anode for fuel oxidation. Furthermore, the Ni/YSZ anode is susceptible to contaminates, such as sulfur, in the fuel stream; sulfur compounds are known to poison the Ni/YSZ based anodes, thereby deactivating the SOFC stack.

There is a long felt need for a SOFC stack that has anodes that are minimally susceptible to degradation due to carbon deposits, Ni grain growth, and sulfur poisoning. There is also a long felt need to be able to treat the Ni/YSZ anodes of an existing SOFC stack in situ to reduce the susceptibility to carbon deposits and Ni/YSZ substrate grain growth.

SUMMARY OF THE INVENTION

Contrary to the recognition by one of ordinary skill in the art that the presence of sulfur is detriment to the performance of a Solid Oxide Fuel Cell (SOFC) stack, it was surprisingly discovered that a diminutive amount of sulfur remaining in the fuel stream feeding the SOFC stack significantly prolonged the operational life and minimized performance degradation of the SOFC stack, while only minimally degrading the voltage and power output of the SOFC stack. It is suspected that this diminutive amount of sulfur in the reformate stream poisons the Ni—YSZ based anode enough to retard both the catalyzing of carbon and the coarsening of the granular microstructure of the nickel/YSZ substrate, but not enough to continually degrade the voltage and power density output of the SOFC stack.

An embodiment of the present invention provides a system for adding sulfur to a fuel cell stack. The system includes a sulfur source and a metering device for adding sulfur to a desulfurized reformate stream that feeds the SOFC stack. The desulfurized reformate stream may be that of a reformate stream from a reformer that reforms a sulfur free hydrocarbon fuel or that of a desulfurized reformate stream exiting a sulfur trap. The sulfur adding system may include a controller in communication with a sulfur sensor disposed in the fuel stream, in which the controller controls the metering device to maintain a predetermined sulfur concentration in the fuel stream to the SOFC stack.

The desired concentration of sulfur in the fuel stream may be ascertained by optimizing the sulfur levels in the fuel stream for a given SOFC stack and system configuration to strike the balance of the desired longevity of the operational life of the SOFC stack with the acceptable degradation in performance. The goal is to obtain a minimal drop in initial power due to the sulfur poisoning of the anodes of the SOFC stack and obtain maximum stability of operation over prolonged periods.

An advantage to this invention is that it offers an effective low cost solution for significantly reducing two known primary SOFC degradation mechanisms: carbon attack of the nickel in the anode and coarsening of nickel particles in the anode. Another advantage is that diminutive amount of sulfur added to the desulfurized fuel stream feeding the SOFC stack significantly prolonged the operational life and minimized performance degradation of the SOFC stack. Still, another advantage is that the invention improves the longevity of the SOFC stack without having to perform extensive modification to the SOFC stack.

Further features and advantages of the invention will appear more clearly on a reading of the following detailed description of an embodiment of the invention, which is given by way of non-limiting example only and with reference to the accompanying drawings.

BRIEF DESCRIPTION OF DRAWINGS

The present invention may best be understood from the following detailed description of the preferred embodiments illustrated in the drawings, wherein:

FIG. 5a shows a system for adding sulfur to a SOFC stack system, in which a sulfur free hydrocarbon fuel is fed to the reformer.

FIG. 5b shows a system for adding sulfur to a SOFC stack system, in which a hydrocarbon fuel containing sulfur contaminants is fed to the reformer.

FIG. 6 shows an alternative embodiment of a system for adding sulfur to a SOFC stack system, which the system includes a bypass of a portion of reformate stream around the sulfur trap.

DETAILED DESCRIPTION OF INVENTION

Figure 1:
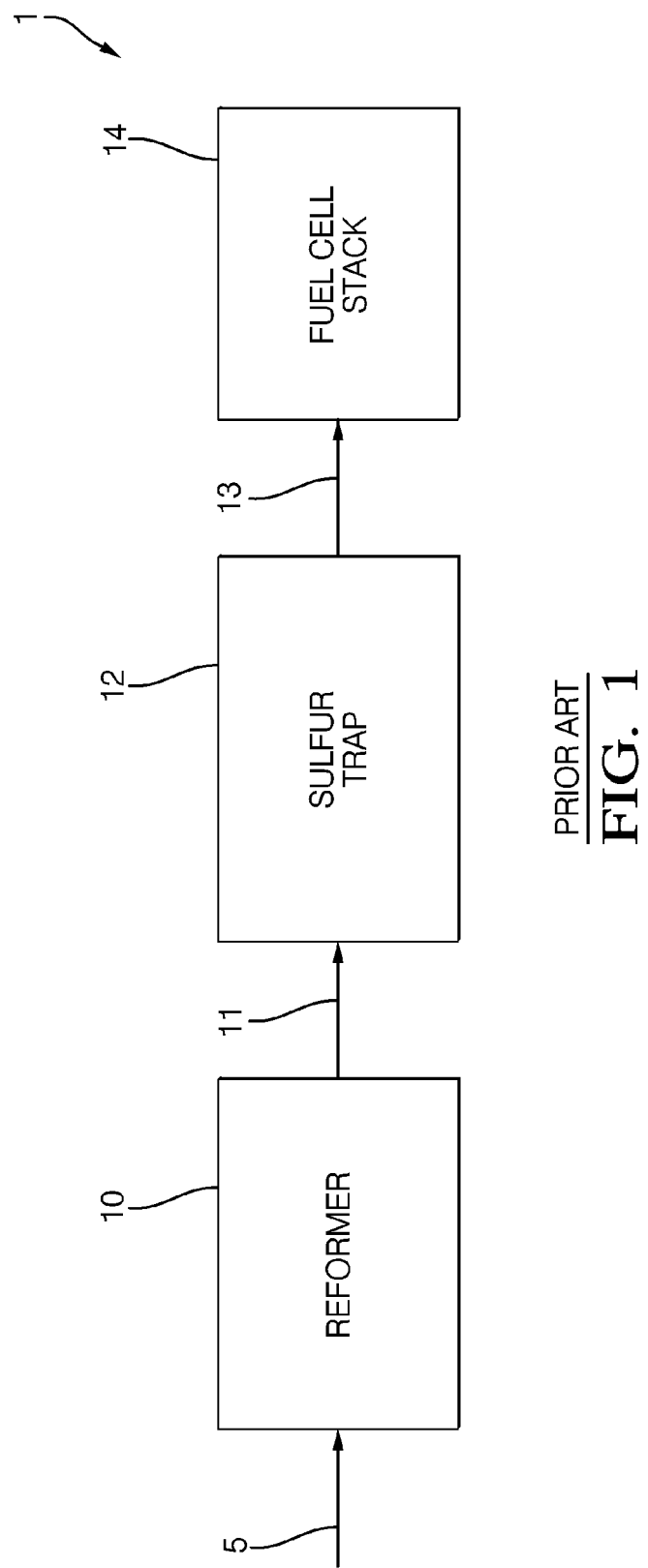
FIG. 1 shows a prior art SOFC system having a reformer, a sulfur trap, and a SOFC stack.

Shown in FIG. 1 is a typical SOFC system 1 known in the art. The SOFC system 1 includes a reformer 10, a sulfur trap 12, and a SOFC stack 14. The reformer 10 is typically of that of a catalytic hydrocarbon reformer that receives a hydrocarbon fuel stream 5. The hydrocarbon fuel stream 5 may be that of gasoline, diesel, ethanol, kerosene, or the likes and may contain impurities such as sulfur, which is typically present in the forms of sulfur compounds such as carbonyl sulfides, disulfides, and mercaptans. The three types of reformer technologies that are typically employed in conjunction with the SOFC stack system 1 are stream reformers, dry reformers, and partial oxidation reformers. The reformer 10 produces a reformate stream 11 by converting the hydrocarbon fuel stream 5 to typically methane, hydrogen, and by-products that includes carbon dioxide, carbon monoxide, hydrogen sulfides ($H_2S$), and sulfur dioxide ($SO_2$).

Sulfur is known to poison the catalytic activity of many metals, including the nickel in the Ni—YSZ based anode of a SOFC. To prevent sulfur poisoning of the SOFC stack 14, a sulfur trap 12 is typically placed downstream of the reformer 10 to receive the reformate stream 11. The sulfur trap 12 contains suitable materials to remove and trap sulfur compounds, including $H_2S$ and $SO_2$, typically found in the reformate steam 11. Exiting the sulfur trap 12 is a desulfurized reformate stream 13 that is directed to the SOFC stack 14.

Contrary to the recognition by others in the industry that the presence of sulfur is detriment to the performance of a SOFC stack 14, it was surprisingly discovered that a diminutive amount of sulfur remaining in the desulfurized reformate stream 13 feeding the SOFC stack 14 significantly prolonged the operational life and minimized performance degradation of the SOFC stack 14, while only minimally degrading the voltage and power output of the SOFC stack 14. It is suspected that this diminutive amount of sulfur in the reformate stream poisoned the Ni—YSZ based anode enough to retard both the catalyzing of carbon and the coarsening of the granular microstructure of the nickel/YSZ substrate, but not enough to continually degrade the voltage and power density output of the SOFC stack 14.

Figure 2:
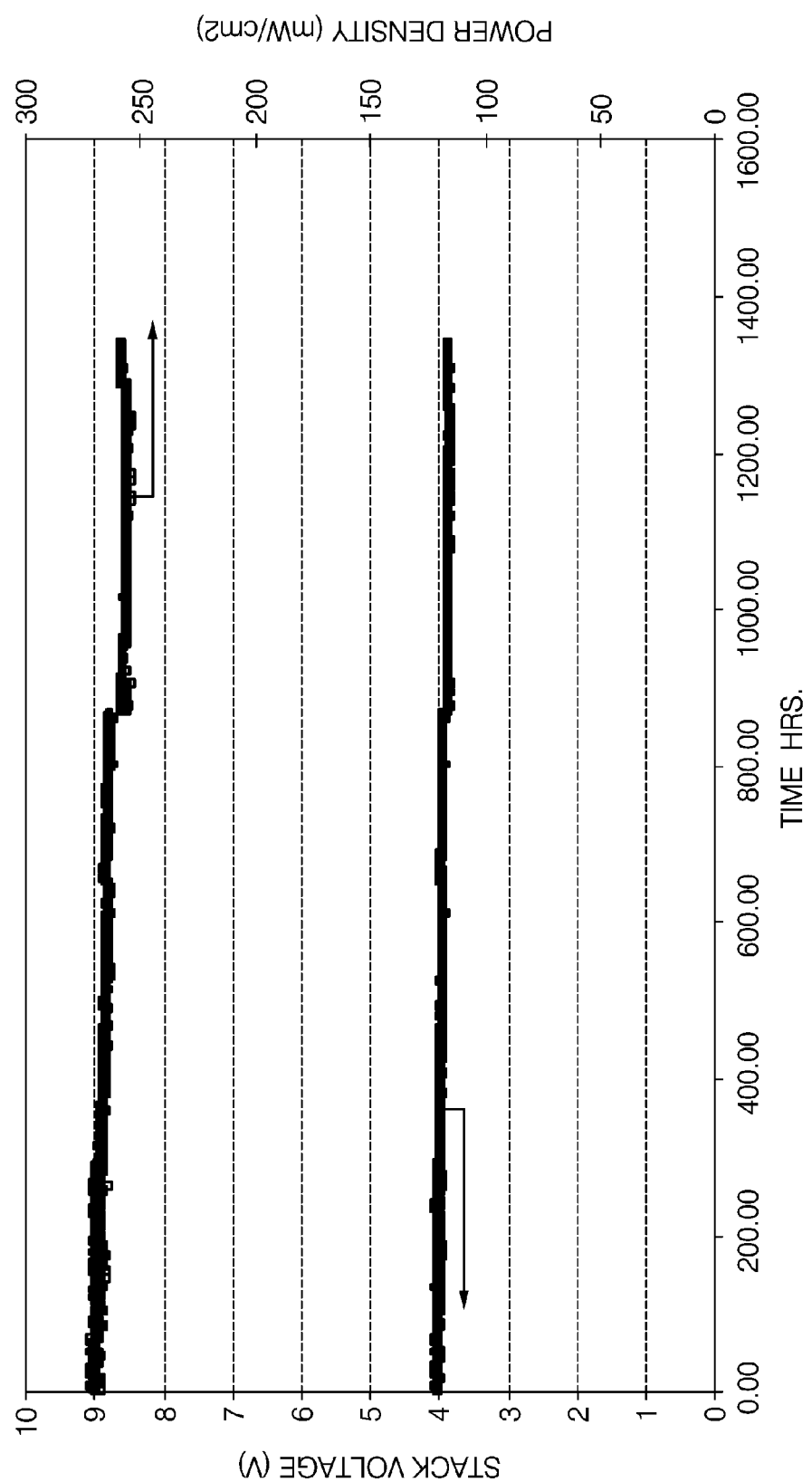
FIG. 2 is a graph showing the voltage and power density outputs of a typical SOFC stack operating on a desulfurized reformate stream.
Figure 3:
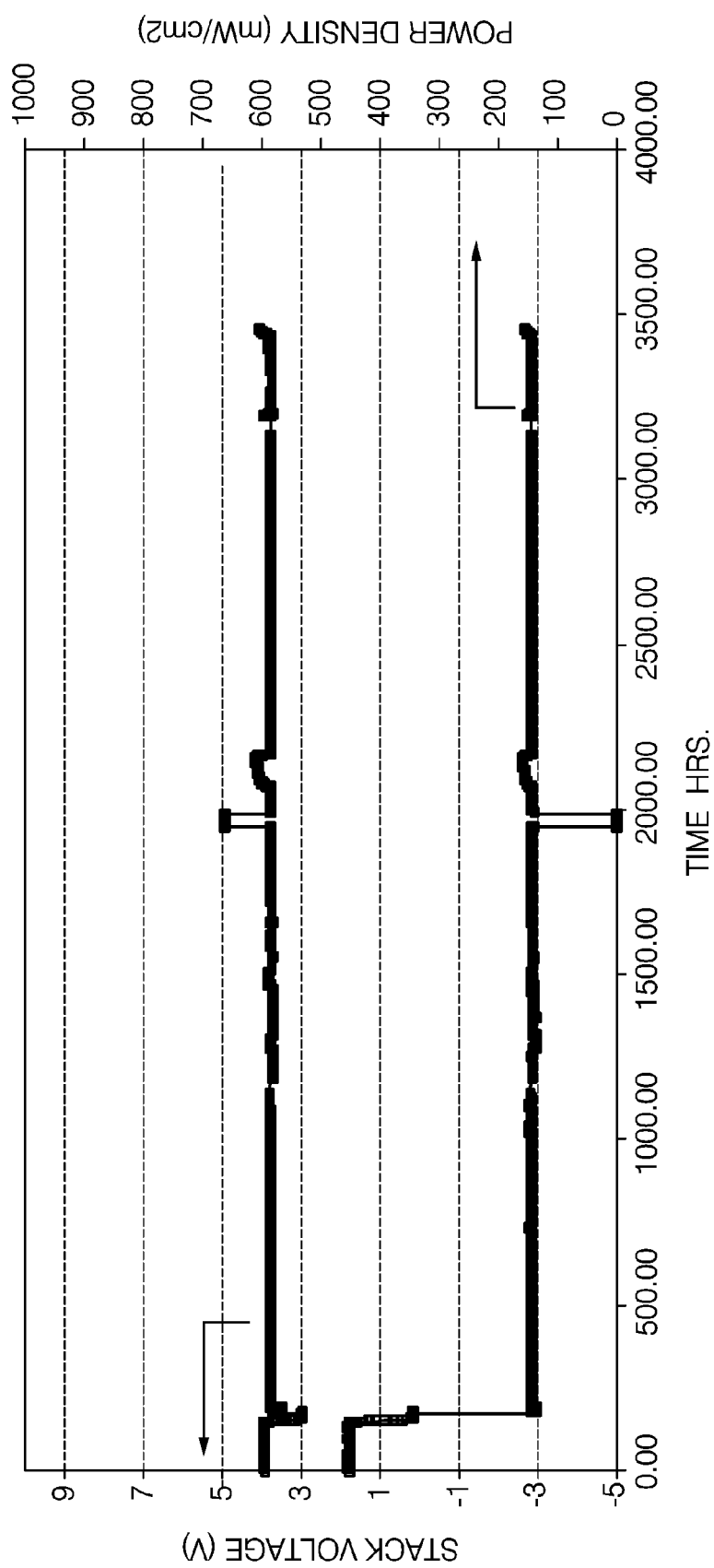
FIG. 3 is a graph showing the voltage and power density outputs of a SOFC stack operating on a reformate stream containing 2.5 ppm by weight of $H_2S$.
Figure 4:
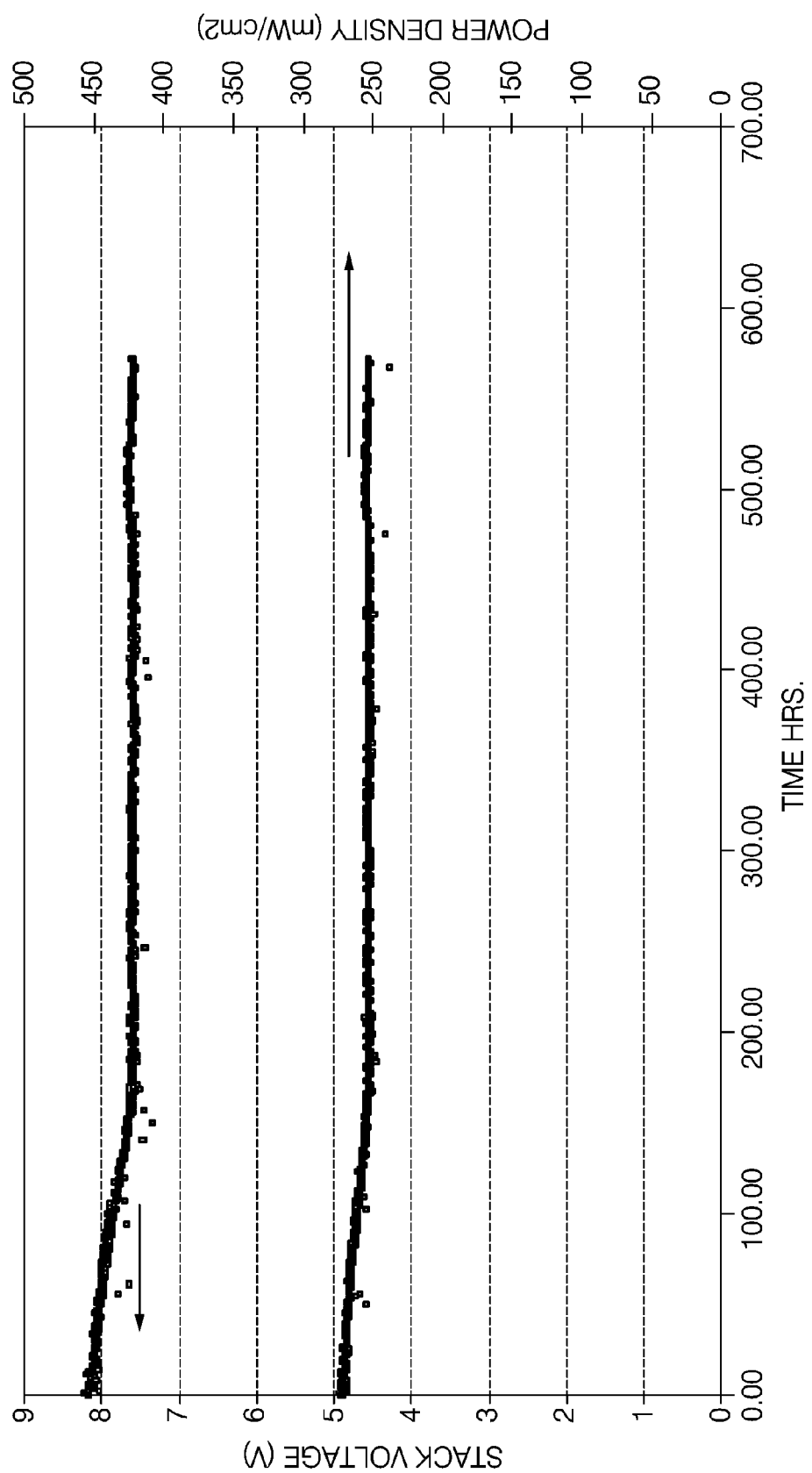
FIG. 4 is a graph showing the voltage and power density outputs of a SOFC stack operating on reformate stream containing 0.1 ppm by weight of $H_2S$.

FIGS. 2, 3, and 4 are graphs showing the voltage and power density outputs for three SOFC stacks. Each of the SOFC stacks was fed a reformate stream containing a different concentration of hydrogen sulfide ($H_2S$). The y-axis on the left side of each of the graphs shows the stack voltage output (V) and the y-axis on the right side of each of the graph shows the power density output (mW/cm2). The x-axis shows the length of time (Hrs) that the SOFC stack was tested at steady state. Referring to FIG. 2, the lower set of data points represents the stack voltage output and the upper set of data represents the power density output. Referring to FIGS. 3 and 4, the upper set of data points shown on each graph represents the stack voltage output and the lower set of data points represents the power density output.

With reference to FIG. 2, a SOFC stack was supplied with a desulfurized reformate stream. Even with a reformate stream free of sulfur, the SOFC stack exhibited a performance degradation of 0.5 to 2% per 500 hours of operating time. After 1300 hours of operating at the steady state, the performance degradation trend of the SOFC stack continued. The decrease in performance of the SOFC stack was attributed to carbon disposition on the surface of the anode and the coarsening of the granular microstructure of the nickel/YSZ anode substrate.

With reference to FIG. 3, a SOFC stack was supplied with a reformate fuel stream having sulfur in the form of $H_2S$ at a concentration of 2.5 parts per million by volume (ppmv). Stacks of 5 cells were operated under normal operating conditions (at constant current with initial stack voltage at V=0.8 Volts per cell, T=750° C., fuel=28% $H_2$, 30% CO, 6% $H_2O$, 2.5 ppmv $H_2S$) for 3453 hours. At constant current, the stack voltage dropped from 0.8V per cell (power density of 450 mW per $cm^2$) to 0.6 Volts per cell as the 2.5 ppmv of $H_2S$ was added to the reformate. The current was lowered to adjust the voltage back up to 0.76 V (power density of 145 mW per $cm^2$). After the initial lowering of power due to $H_2S$, the stack showed minimal or no degradation during the course of this long-term durability test (3453 hours).

Surprisingly, it was found that after the initial voltage and power density drop, the SOFC stack did not exhibited any further significant performance degradation over 3,000 hours of continuous steady state operation. Transmission electron microscopy (TEM) analysis of the anode did not show any damage in the Ni—YSZ structure. The nickel in the anode was unaffected by carbon present in the reformate fuel stream, and the nickel particles exhibited very little, if any, coarsening of the nickel particle microstructure With reference to FIG. 4, a SOFC stack was supplied with a reformate fuel having sulfur in the form of $H_2S$ at a minimal concentration of 0.10 ppmv. This continual addition of sulfur in the reformate fuel to the SOFC stack caused a slight degradation in performance of approximately 0.5 V and 25 $mW/cm^2$ within approximately 175 hours of steady state operation. Again, surprisingly, it was found that the rate of performance degradation was significantly reduced thereafter. In other words, by adding a small amount sulfur to the reformate stream to the SOFC stack caused a slight initial degradation in performance, but in return, retarded the long term degradation of the performance of the SOFC stack. Even after 550 hours of steady state operation, the SOFC stack did not exhibit any measurable degradation in performance.

If a sulfur free hydrocarbon fuel or pure hydrogen is supplied to the SOFC stack, sulfur in the form of $H_2S$ may be added to the fuel stream during the start-up of the SOFC stack and periodically thereafter during steady state operations to increase the operating life of the SOFC stack. The concentration of sulfur required in the reformate stream may vary depending on the nature of the Ni particles in the anode of the SOFC stack. The desired concentration may be ascertained by optimizing the $H_2S$ levels in the fuel stream for a given stack and system configuration to strike the balance of the desired longevity of the operational life of the SOFC stack with the acceptable degradation in performance. The goal is to obtain minimal drop in initial power due to the sulfur poisoning of the anode and obtain maximum stability of operation over prolonged periods. With reference to FIGS. 3 and 4, the addition of approximately 0.10 to 2.5 ppmv of $H_2S$ minimally poisoned the anode of the SOFC stack, but yet provided stability of performance over thousands of hours. It is believed that as little as 0.010 ppmv of $H_2S$ may be beneficial to the longevity of a SOFC stack.

Each of FIGS. 5a, 5b, and 6 shows a SOFC system 100 having a hydrocarbon reformer 110, a SOFC stack 114, and a system for adding sulfur to the SOFC stack 114. The reformer 110 produces a typical reformate stream 111 by converting a sulfur free hydrocarbon fuel stream 105 to methane, hydrogen, and by-products that includes carbon dioxide, and carbon monoxide. Sulfur free hydrocarbon fuels may include hydrocarbon fuels that have been processed to remove sulfur or non-hydrocarbon fuels such as hydrogen. If the hydrocarbon fuel stream 105 contains sulfur contaminants, then sulfur containing by-products such as hydrogen sulfides ($H_2S$) and sulfur dioxide ($SO_2$) are also included in the reformate stream 111.

Shown in FIG. 5a, if the hydrocarbon fuel steam 105 to the reformer 110 is sulfur free, then a metering device 206, such as a variable pump or a metering valve, may be provided to inject sulfur from a sulfur source 208 in the form of $H_2S$ directly into the sulfur free reformate stream 111 at a predetermined flow rate to achieve the desired concentration of sulfur in the conditioned reformate stream 115 to the SOFC stack 114.

Shown in FIG. 5b, if the hydrocarbon fuel 105 fed to the reformer 110 contains sulfur contaminants, then a sulfur trap 112 is provided downstream of the reformer 110 to remove sulfur from the reformate stream 111 to produce a desulfurized reformate stream 113. A metering device 206 may be provided to inject sulfur from a sulfur source 208 in the form of $H_2S$ directly into the desulfurized reformate stream 113 producing a conditioned reformate stream 115. A sulfur sensor 202 in communication with a controller 204 may be positioned in the conditioned reformate stream 115 to control the injection rate of sulfur into the desulfurized reformate stream 113 to maintain a desired predetermined concentration of sulfur in the conditioned reformate stream 115. As an alternative embodiment, the sulfur sensor 202 may be positioned upstream in the desulfurized reformate stream 113 (not shown).

Shown in FIG. 6 is an alternative embodiment of the invention for use with a SOFC stack system 100 that accepts a hydrocarbon fuel stream 105 containing sulfur contaminants for the reformer 110. The system shown in FIG. 6 maintains a predetermined level of sulfur concentration in the conditioned reformate stream 115 to the SOFC 114 stack by bypassing a portion 209 of the reformate stream 111 around the sulfur trap 112 and combines the bypassed portion 209 of reformate stream 111 with the desulfurized reformate stream 113 producing the conditioned reformate stream 115. The sulfur addition system shown in FIG. 6 includes a sulfur sensor 202 positioned in the conditioned reformate stream 115. An alternative embodiment is to position the sulfur sensor 202 in the desulfurized reformate stream 113 upstream of the conditioned reformate stream 115 (not shown).

The sulfur sensor 202 works in conjunction with the controller 204 to detects and monitor the concentration of sulfur in the conditioned reformate stream 115 to the SOFC stack 114. If the concentration of sulfur is below a predetermined level, the controller activates the metering device 206 to bypass a larger portion of the reformate stream 111 containing sulfur around the sulfur trap 112 to combined with the desulfurized reformate stream 113. If the concentration of sulfur is above a predetermined level, the controller 204 reduces or eliminate the bypass portion 209 and direct a greater portion of the reformate stream 111 through the sulfur trap 112.

An advantage to this invention is that it offers an effective low cost solution for significantly reducing carbon attack of the nickel in the anode. Another advantage to this invention is that it offers an effective low cost solution for significantly reducing coarsening of nickel particles in the anode. Still, another advantage is that diminutive amount of sulfur added to desulfurized reformate stream feeding the SOFC stack significantly prolonged the operational life and minimized performance degradation of the SOFC stack. Yet, still another advantage is that the invention can improve the longevity of the SOFC stack system without having to perform extensive modification to the SOFC stack system.

While this invention has been described in terms of the preferred embodiments thereof, it is not intended to be so limited, but rather only to the extent set forth in the claims that follow.

Having described the invention, it is claimed:

1. A system for adding sulfur to a reformate stream feeding a fuel cell stack having Ni—YSZ anodes, comprising:
    a sulfur source for providing sulfur to said reformate stream; and
    a metering device in fluid connection with said sulfur source and said reformate stream, wherein said metering device injects sulfur from said sulfur source to said reformate stream at a predetermined rate, thereby providing a conditioned reformate stream to said Ni—YSZ anodes of fuel cell stack.

2. The system for adding sulfur to a reformate stream feeding a fuel cell stack having Ni—YSZ anodes of claim 1, further comprising a controller in communication with said metering device, wherein said controller is configured to adjust said predetermined rate that said metering device injects sulfur to said reformate stream.

3. The system for adding sulfur to a reformate stream feeding a fuel cell stack having Ni—YSZ anodes of claim 2, wherein said sulfur source comprises $H_2S$.

4. The system for adding sulfur to a reformate stream feeding a fuel cell stack having Ni—YSZ anodes of claim 3, wherein said predetermined rate provides for a sulfur concentration in said conditioned reformate stream that gives an acceptable balance of minimal drop in initial power with the desired maximum stability of operation over prolonged periods for said fuel cell stack.

5. The system for adding sulfur to a reformate stream feeding a fuel cell stack having Ni—YSZ anodes of claim 3, wherein said predetermined rate provides a sulfur concentration of 0.01 to 2.5 ppmv in said conditioned reformate stream.

6. The system for adding sulfur to a reformate stream feeding a fuel cell stack having Ni—YSZ anodes of claim 3, wherein said predetermined rate provides a sulfur concentration of 0.1 to 2.5 ppmv in said conditioned reformate stream.

7. The system for adding sulfur to a reformate stream feeding a fuel cell stack having Ni—YSZ anodes of claim 2, further comprising a
 a sulfur sensor disposed in one of said reformate stream or conditioned reformate stream, wherein said sulfur sensor is in communications with said controller to maintain said predetermined rate based on sulfur concentration in one of said reformate stream or conditioned reformate stream.

\* \* \* \* \*